(12) United States Patent
Kozono et al.

(10) Patent No.: US 12,046,850 B2
(45) Date of Patent: Jul. 23, 2024

(54) CONNECTOR CONFIGURATION FOR CONNECTING A FIRST CONNECTOR TO A SECOND CONNECTOR

(71) Applicant: Yazaki Corporation, Tokyo (JP)

(72) Inventors: Seiji Kozono, Kakegawa (JP); Yoshitaka Tsushima, Fujieda (JP); Masaya Okamoto, Fujieda (JP)

(73) Assignee: Yazaki Corporation, Tokyo (JP)

( * ) Notice: Subject to any disclaimer, the term of this patent is extended or adjusted under 35 U.S.C. 154(b) by 296 days.

(21) Appl. No.: 17/682,569

(22) Filed: Feb. 28, 2022

(65) Prior Publication Data

US 2022/0302642 A1    Sep. 22, 2022

(30) Foreign Application Priority Data

Mar. 1, 2021    (JP) .................................. 2021-031857

(51) Int. Cl.
*H01R 13/453* (2006.01)
*H01R 13/502* (2006.01)
*H01R 13/629* (2006.01)

(52) U.S. Cl.
CPC ....... *H01R 13/4536* (2013.01); *H01R 13/502* (2013.01); *H01R 13/629* (2013.01)

(58) Field of Classification Search
CPC .. H01R 13/64; H01R 13/5213; H01R 13/629; H01R 13/4536; H01R 13/4532
USPC ........................................................ 439/138
See application file for complete search history.

(56) References Cited

U.S. PATENT DOCUMENTS

| 5,372,515 A | 12/1994 | Miller et al. |
| 5,716,224 A | 2/1998 | Masuda et al. |
| 6,287,133 B1* | 9/2001 | Yang .................. H01R 13/4536 439/138 |
| 6,935,873 B2* | 8/2005 | Funatsu ............. H01R 13/4532 439/137 |
| 7,140,892 B2* | 11/2006 | Takeuchi ........... H01R 13/6583 439/138 |
| 8,376,760 B1* | 2/2013 | Kostrzewski ........... G06F 21/86 439/138 |

(Continued)

FOREIGN PATENT DOCUMENTS

| CN | 109119802 A  *  1/2019 |
| CN | 107302155 B     4/2019 |

(Continued)

OTHER PUBLICATIONS

Jul. 19, 2022—(EP) Extended Search Report—App 22159354.4.

*Primary Examiner* — Marcus E Harcum
(74) *Attorney, Agent, or Firm* — Banner & Witcoff, Ltd.

(57) ABSTRACT

There is provided a connector configured by a first connector and a second connector which are fitted and electrically connected to each other. The first connector includes: a first housing; and a projecting portion that projects backward from an end portion of the first housing and extends in a fitting direction. The second connector includes: a terminal; a cap that covers a front surface of the terminal; and a second housing including a guide groove that guides the projecting portion and supporting a rotating shaft. The guide groove extends along the fitting direction from an opening portion on a side of the first connector with respect to the rotating shaft toward an opposite side to the first connector.

2 Claims, 8 Drawing Sheets

(56) References Cited

U.S. PATENT DOCUMENTS

| | | | |
|---|---|---|---|
| 8,770,860 B2* | 7/2014 | Affre De Saint Rome | H01R 13/5213 439/138 |
| 10,355,390 B2* | 7/2019 | Ferran Palau | H01R 13/629 |
| 10,700,466 B2* | 6/2020 | Brodsky | H01R 13/4538 |
| 11,721,926 B2* | 8/2023 | Kozono | H01R 13/4532 439/139 |
| 11,784,433 B2* | 10/2023 | Ruiz Rivas | H01R 13/4536 439/367 |
| 2001/0049214 A1* | 12/2001 | Billman | H01R 13/6583 439/138 |
| 2012/0015536 A1* | 1/2012 | Huang | H01R 13/4536 439/138 |
| 2013/0017696 A1* | 1/2013 | Alvarez Rivera | H01R 13/5213 439/142 |
| 2015/0378125 A1* | 12/2015 | Sales Casals | H01R 43/26 439/271 |
| 2016/0104962 A1* | 4/2016 | Lee | H01R 13/4536 439/138 |
| 2018/0309222 A1 | 10/2018 | Ferran Palau et al. | |
| 2020/0275827 A1* | 9/2020 | Weise | A61B 1/00114 |

FOREIGN PATENT DOCUMENTS

| | | | |
|---|---|---|---|
| CN | 111370908 A * | 7/2020 | |
| JP | H08-138785 A | 5/1996 | |
| JP | 2005-080490 A | 3/2005 | |
| WO | WO-2018130338 A1 * | 7/2018 | |

\* cited by examiner

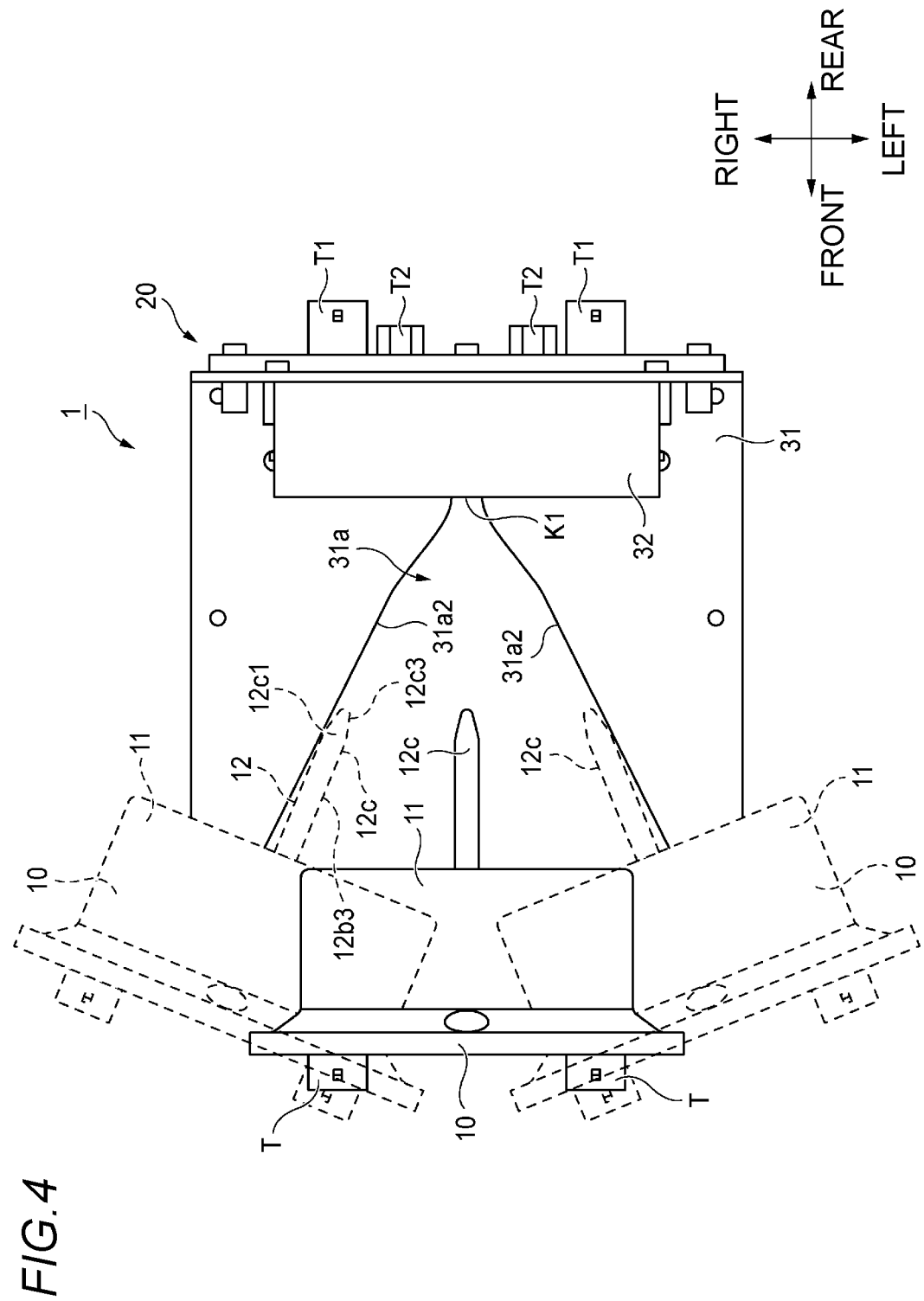

CONNECTOR CONFIGURATION FOR CONNECTING A FIRST CONNECTOR TO A SECOND CONNECTOR

CROSS-REFERENCE TO RELATED APPLICATIONS

This application is based on and claims priority under 35 USC 119 from Japanese Patent Application No. 2021-031857 filed on Mar. 1, 2021, the contents of which are incorporated herein by reference.

TECHNICAL FIELD

The present disclosure relates to a connector.

BACKGROUND ART

Charging is performed by fitting a power feeding side connector to a power receiving side connector provided in an electric vehicle or a hybrid vehicle. A connector of this type is equipped with an openable and closable cap for the purpose of dustproofing, terminal protection, electric shock prevention to surroundings, and the like, and when the connector is not connected, the cap is closed to prevent terminals from being exposed (see, for example, JPH08-138785A).

In a connector described in JPH08-138785A, a cap that can rotate around a pin is provided on a housing of a power receiving side connector, and when the connector is fitted, an end of the cap is pressed by a tip portion (fitting hood portion) of a housing of a power feeding side connector. When the end of the cap is pressed, the cap rotates around the pin and opens, a terminal in the housing is opened and exposed, and the terminal can be connected to another terminal.

In the connector described in JPH08-138785A, during the fitting, when the end of the cap is pressed by the tip portion of the fitting hood portion of the power deeding side connector, the cap rotates and opens. However, the fitting is possible even if a relative positional relation between the power feeding side connector and the power receiving side connector deviates from a correct fitting position. Therefore, the connector may be assembled from any angle when the power feeding side connector and the power receiving side connector are fitted to each other, and when the connector is assembled from an incorrect angle, opening and closing operations of the cap may be interfered, and there is a risk that the two connectors cannot be fitted to each other smoothly.

SUMMARY OF INVENTION

The present disclosure provides a connector capable of position correction during fitting.

According to an illustrative aspect of the present disclosure, a connector includes: a first connector; and a second connector, the connector being configured by the first connector and the second connector which are fitted and electrically connected to each other. The first connector includes: a first housing, and a projecting portion that projects from an end portion of the first housing and extends toward the second connector in a fitting direction of the first connector and the second connector. The second connector includes: a terminal extending in the fitting direction, a cap including a cover portion that covers a surface of the terminal on a side of the first connector, a rotating shaft provided on an edge portion of the cover portion, and a contact portion extending to an opposite side to the cover portion from the rotating shaft and abuttable on the projecting portion, and a second housing including a guide groove that guides the projecting portion and supporting the rotating shaft. The guide groove extends along the fitting direction from an opening portion on the side of the first connector with respect to the rotating shaft toward an opposite side to the first connector.

The present disclosure has been briefly described as above. Details of the present disclosure will be further clarified by reading an aspect (hereinafter, referred to as an "embodiment") for implementing the invention to be described below with reference to the accompanying drawings.

BRIEF DESCRIPTION OF DRAWINGS

FIG. 4 is a bottom view showing an image of assembling the connector;

DESCRIPTION OF EMBODIMENTS

A specific embodiment according to the present disclosure will be described below with reference to the accompanying drawings.

As an example, a connector of the present embodiment is applied to a connector in which a power feeding side connector and a power receiving side connector of an electric vehicle or the like are fitted and electrically connected to each other.

Figure 1:
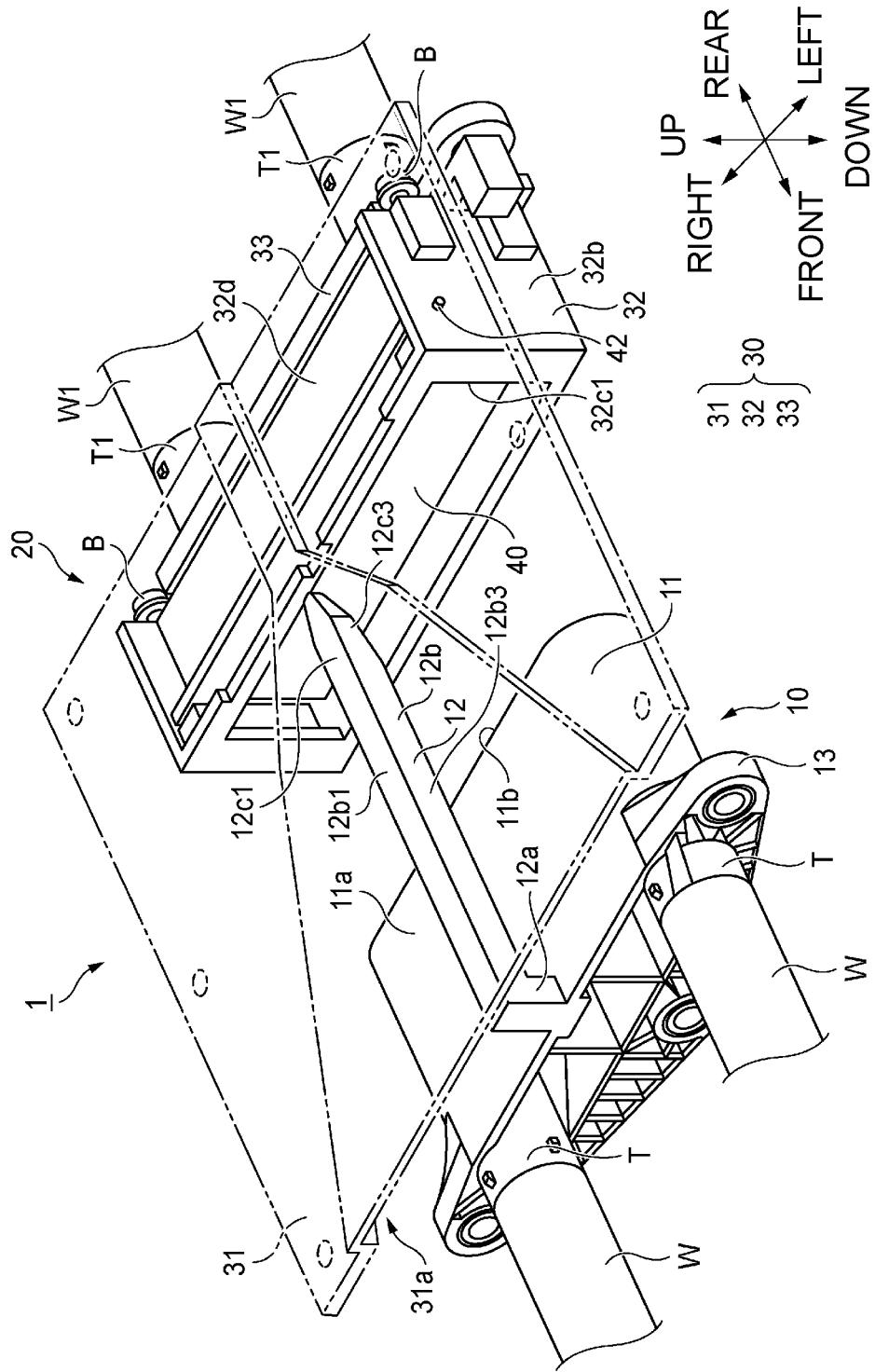
FIG. 1 is a perspective view of a connector according to an embodiment of the present disclosure.
Figure 2:
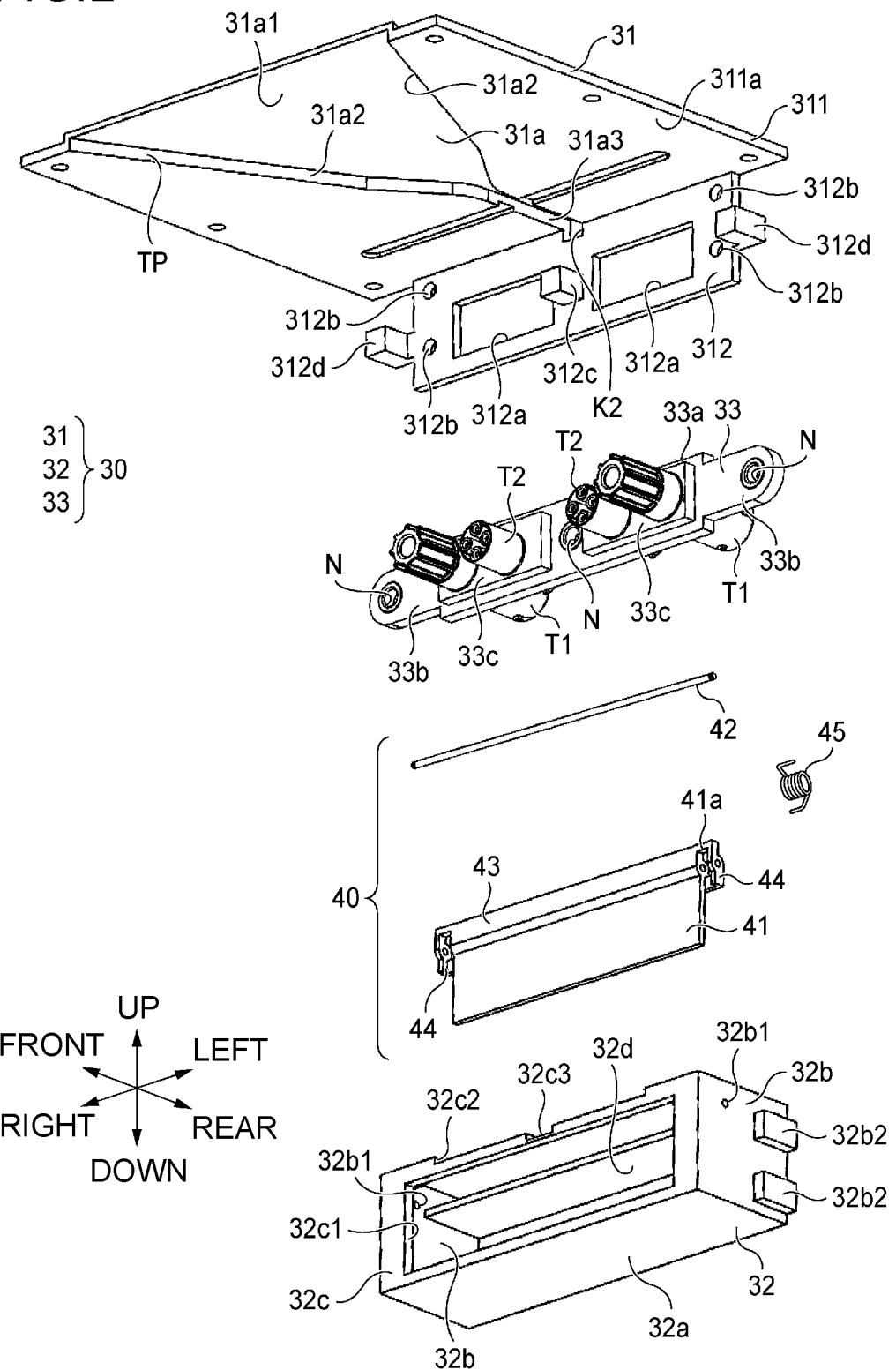
FIG. 2 is an exploded perspective view of a second connector shown in FIG. 1.

FIG. 1 is a perspective view of a connector 1 according to the embodiment of the present disclosure. FIG. 1 shows a state of a first connector 10 and a second connector 20 during fitting, and shows a state in which an upper housing 31 of the second connector 20 is perspective. FIG. 2 is an exploded perspective view of the second connector 20 shown in FIG. 1. Hereinafter, for convenience of explanation, "front", "rear", "left", "right", "up", and "down" are defined as shown in FIG. 1. A "front-rear direction", a "left-right direction", and an "up-down direction" are orthogonal to one another. The "front-rear direction" corresponds to a fitting direction of the first connector 10 and the second connector 20.

The connector 1 shown in FIG. 1 includes the first connector 10 and the second connector 20 that are fitted and electrically connected to each other. A plurality of terminals T are mounted on the first connector 10, and a plurality of terminals T1 and T2 (first terminal and second terminal) connected to the plurality of terminals T are mounted on the second connector 20. The terminals T1 and T2 are provided on both left and right sides of the second connector 20. The terminal T1 has a diameter larger than that of the terminal T2, and for example, one power cable is connected to the terminal T1 and, for example, four communication lines are connected to the terminal T2. The plurality of terminals T of the first connector 10 are provided corresponding to the terminals T1 and T2. In FIG. 1, electric wires W and W1 connected to the terminals T and T1 are shown, and other electric wires connected to the terminals T2 and T are not shown.

The first connector 10 includes a housing 11 having arcuate sides extending in a front-rear direction of a rectangular parallelepiped shape. A rear side of the housing 11 is formed with openings into which the terminals T1 and T2 of the second connector 20 can be inserted, and a front side of the housing 11 is formed with openings into which the terminals T connected to the electric wires W can be inserted and mounted. The first connector 10 includes a front surface portion 13 that covers the front side of the housing 11. The front surface portion 13 has a substantially rectangular plate shape with a center in the left-right direction projecting downward, is attached to the front side of the housing 11, and is formed with openings through which the terminals T can be inserted.

An upper surface 11a of the housing 11 of the first connector 10 includes a rod-shaped projecting portion 12 extending rearward (toward the second connector 20) from an end portion 11b on a rear side of the housing 11. The projecting portion 12 includes a root portion 12a extending upward at a center in the left-right direction at a front end portion (position of the front surface portion 13) of the upper surface 11a, a main body portion 12b extending linearly from an upper end of the root portion 12a toward the rear side, and a tip portion 12c gradually narrowed toward the rear side. The main body portion 12b has a long rectangular parallelepiped shape in the front-rear direction.

Figure 7A:
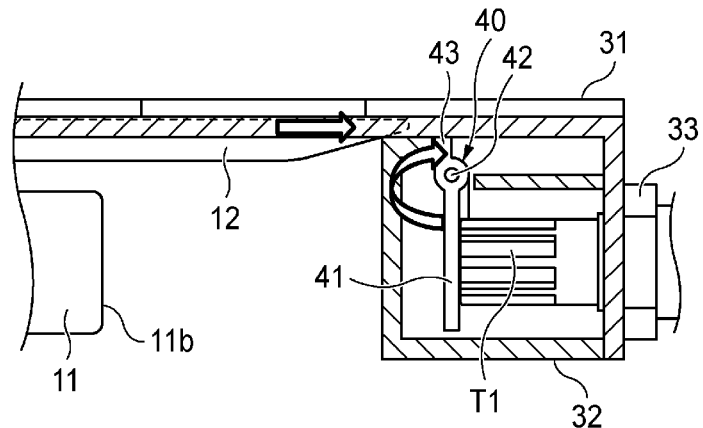
FIGS. 7A to 7C are cross-sectional views showing operation images when connectors are fitted to each other.
Figure 7B:
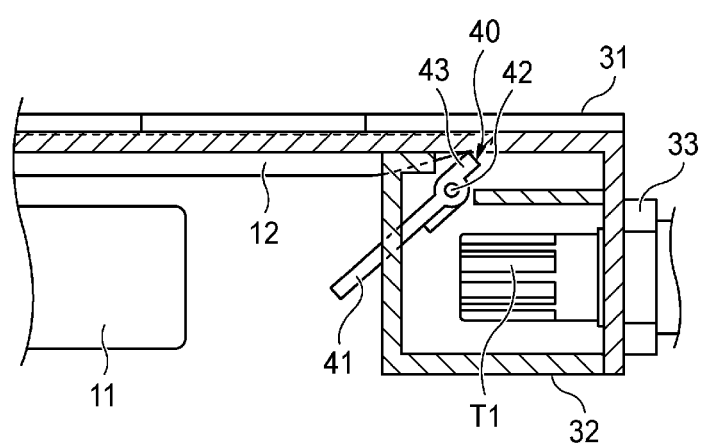
Figure 7C:
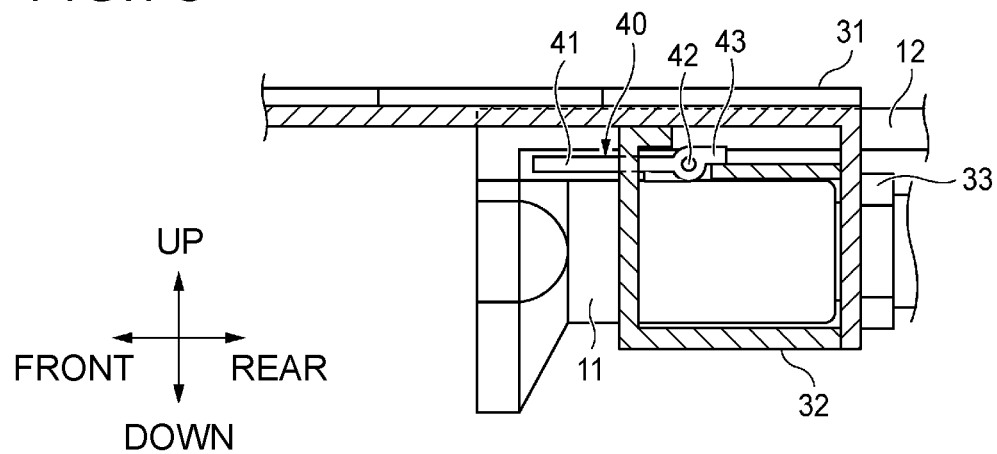

The tip portion 12c includes an upper surface 12c1 continuous with an upper surface 12b1 of the main body portion 12b, and a lower surface 12c2 that is continuous with a lower surface 12b2 of the main body portion 12b and gradually approaches the upper surface 12c1 toward the rear side (that is, is inclined with respect to the upper surface 12c1) (see FIGS. 7A to 7C). The tip portion 12c includes left and right side surfaces 12c3 connecting the upper surface 12c1 and the lower surface 12c2 (see FIG. 4). The side surfaces 12c3 are continuous with left and right side surfaces 12b3 of the main body portion 12b, and the side surfaces 12c3 are parallel to each other up to approximately a center of the tip portion 12c in the front-rear direction and come close to each other toward the rear side.

As shown in FIG. 2, the second connector 20 includes a housing 30, the plurality of terminals T1 and T2 mounted on the housing 30 and extending in the front-rear direction, and a cap 40 that can be opened and closed so as to cover front surfaces (surfaces on the first connector 10 side) of the plurality of terminals T1 and T2. The housing 30 includes an upper housing 31, a lower housing 32, and a terminal holding portion 33.

The upper housing 31 includes a substantially square plate-shaped flat plate portion 311 and a substantially rectangular plate-shaped rear wall portion 312 extending downward from a rear end edge of the flat plate portion 311. The flat plate portion 311 includes a guide groove 31a that guides the projecting portion 12 of the first connector 10, and a concave portion 31b that extends in the left-right direction so as to intersect the guide groove 31a. The concave portion 31b is provided corresponding to a position of the cap 40 disposed below. As an example, an upper surface of the flat plate portion 311 of the upper housing 31 is attached to a vehicle body.

The guide groove 31a extends along the front-rear direction from a front end edge to a rear end edge of the flat plate portion 311 and has a substantially Y-shaped contour when viewed from above. The guide groove 31a includes a bottom portion 31a1 in which the flat plate portion 311 is recessed upward from a lower surface 311a side. The bottom portion 31a1 is parallel to the lower surface 311a. The guide groove 31a includes left and right hypotenuse portions 31a2 that connect the lower surface 311a to the bottom portion 31a1, and left and right side wall portions 31a3 that connect to each of the hypotenuse portions 31a2. The left and right hypotenuse portions 31a2 gradually approach each other from the vicinity of both left and right edges of the front end edge of the flat plate portion 311 toward the rear side, and are connected to the left and right side wall portions 31a3 at a position away from the front end edge by about three-quarters of a front-rear length of the flat plate portion 311.

The left and right side wall portions 31a3 extend in parallel with each other from positions connected to the left and right hypotenuse portions 31a2 to the rear end edge of the flat plate portion 311. A distance between the left and right side wall portions 31a3 corresponds to a width (length in the left-right direction) of the projecting portion 12 (main body portion 12b). The guide groove 31a is disposed immediately above a concave portion 32c3 of the lower housing 32, which will be described later, in the vicinity of front end positions of the left and right side wall portions 31a3 in a state where the upper housing 31 is assembled to the lower housing 32, and forms a first opening portion K1 (see FIG. 1) together with the concave portion 32c3. A size of the first opening portion K1 in the up-down direction corresponds to a size of the main body portion 12b of the projecting portion 12 in the up-down direction.

The guide groove 31a extends from the first opening portion K1 toward the rear side (opposite to the first connector 10) along the fitting direction (front-rear direction). By providing the hypotenuse portions 31a2 on the flat plate portion 311, the guide groove 31a includes a tapered portion TP whose width decreases toward the first opening portion K1 from an end portion on the first connector 10 side of the flat plate portion 311 (the front end edge of the flat plate portion 311). Both side wall portions 31a3 of the guide groove 31a are provided in a region of the housing 30 (upper housing 31, lower housing 32) of the second connector 20 close to the terminals T2. The terminals T2 have a smaller diameter than the terminals T1, and the terminals T1 and T2 are arranged so that positions of lower surfaces thereof in the up-down direction are common. Therefore, a wider space is secured above the terminals T2 than above the terminals T1. By providing the guide groove 31a in this space, dead space can be effectively utilized.

During fitting of the first connector 10 and the second connector 20, the guide groove 31a guides the first connector 10 so as to be assembled to the second connector 20 at a correct angle by the tip portion 12c of the projecting portion 12 advancing rearward while sliding on the bottom portion 31a1, the hypotenuse portions 31a2, and the side wall portions 31a3.

The rear wall portion 312 is formed with rectangular openings 312a through which the terminals T1 and T2 can be inserted on left and right sides, and is formed with holes 312b through which bolts (not shown) can be inserted at four corners respectively. The rear wall portion 312 includes a block-shaped mounting portion 312c extending forward from a front surface side between the left and right openings 312a, and block-shaped mounting portions 312d that protrude from left and right side edges of the rear wall portion 312 to the left and right sides and extend forward. The rear wall portion 312 is integrally molded with the flat plate portion 311 as an example, so that an upper end edge of the rear wall portion 312 is connected to the lower surface 311a of the flat plate portion 311. At a position on the upper end edge of the rear wall portion 312 corresponding to the guide groove 31a (side wall portions 31a3) of the flat plate portion 311, a concave portion is provided to form a second opening portion K2.

The lower housing 32 is disposed below the upper housing 31 on a rear side of the upper housing 31. The lower housing 32 includes a rectangular plate-shaped bottom wall portion 32a parallel to the lower surface 311a of the upper housing 31, substantially square plate-shaped side wall portions 32b extending upward from left and right side edges of the bottom wall portion 32a, and a front wall portion 32c attached to a front side of the bottom wall portion 32a and the side wall portions 32b. The lower housing 32 includes a rectangular plate-shaped upper wall portion 32d disposed in parallel with the bottom wall portion 32a between the left and right side wall portions 32b. A length of the upper wall portion 32d in the front-rear direction is shorter than a length of the bottom wall portion 32a in the front-rear direction, and a front end of the upper wall portion 32d and the front wall portion 32c are separated from each other.

The left and right side wall portions 32b each include a hole 32b1 through which a shaft pin 42 is inserted, immediately above a mounting position of the upper wall portion 32d. The left and right side wall portions 32b each include two block-shaped mounting portion 32b2 arranged vertically along a rear end edge of the side wall portion 32b on each outer side (left and right side) thereof.

The front wall portion 32c includes a rectangular opening 32c1 capable of accepting the housing 11 of the first connector 10. The front wall portion 32c includes a stepped portion 32c2 whose center is lowered except for left and right ends of an upper end edge thereof, and a concave portion 32c3 is provided at a center of the stepped portion 32c2 in the left-right direction.

The terminal holding portion 33 is attached to the upper housing 31 as shown in FIG. 2. The terminal holding portion 33 holds the plurality of terminals T1 and T2 arranged in a space surrounded by the rear wall portion 312 of the upper housing 31, the bottom wall portion 32a of the lower housing 32, the left and right side wall portions 32b, the front wall portion 32c, and the upper wall portion 32d. The terminal holding portion 33 includes a substantially rectangular plate-shaped main body portion 33a, bulging portions 33b on both left and right side edges of the main body portion 33a, and mounting plates 33c provided on left and right sides on a front surface of the main body portion 33a. The main body portion 33a and the mounting plates 33c each include an opening through which the plurality of terminals T1 and T2 are inserted. In the main body portion 33a, through holes to which nuts N are mounted are provided between the left and right mounting plates 33c and on the left and right bulging portions 33b.

The cap 40 is provided on the lower housing 32 and can be opened and closed so as to cover the front surfaces (the surfaces on the first connector 10 side) of the plurality of terminals T1 and T2 from an upper side. The cap 40 includes a rectangular plate-shaped cover portion 41 that covers the front surfaces of the terminals T1 and T2, and a shaft pin 42 (rotating shaft) that is inserted into a through hole 41a that extends in the left-right direction and is provided on an upper edge portion of the cover portion 41. The cap 40 includes a rectangular plate-shaped contact portion 43 that extends to an opposite side of the cover portion 41 with the shaft pin 42 sandwiched between the cover portion 41 and the contact portion 43, and abuts on the projecting portion 12 of the first connector 10 abuts when the first connector 10 and the second connector 20 are fitted to each other. On left and right sides of the cover portion 41, spring mounting portions 44 for mounting torsion coil springs 45 to the shaft pin 42 inserted through the through hole 41a are provided. As an example, one end of the torsion coil spring 45 is fixed to the cover portion 41 of the cap 40, and the other end thereof is fixed to the front wall portion 32c of the lower housing 32 to urge the cap 40 in a closing direction (so that the cap 40 extends along the up-down direction). The torsion coil spring 45 may be attached to at least one of the left and right spring mounting portions 44. Since the cap 40 is urged in the closing direction by the torsion coil spring 45, the cap 40 is maintained to be closed when the contact portion 43 is not pressed by the projecting portion 12.

The cap 40 is in a closed state that covers the front surfaces of the terminals T1 and T2 by disposing the contact portion 43 and the cover portion 41 along the up-down direction. When the contact portion 43 is pressed rearward, the cover portion 41 rotates around the shaft pin 42 in a direction away from the terminals T1 and T2. By rotating in this way, the cap 40 is in an open state in which the front surfaces of the terminals T1 and T2 are exposed and opened.

Assembly of the second connector 20 will be described.

The terminal holding portion 33 is arranged in a state where the plurality of terminals T1 and T2 are inserted into the opening 312a of the upper housing 31 from the rear side and the mounting plate 33c is fitted into the opening 312a. In this state, each nut N is aligned with each screw hole provided in each of the mounting portions 312c and 312d, and bolts (not shown) are rotationally inserted from the rear side, so that the terminal holding portion 33 is assembled to the upper housing 31.

When assembling the cap 40 to the lower housing 32, under a state where the torsion coil spring 45 is fitted into one of the spring mounting portions 44, and the shaft pin 42 is inserted into the through hole 41a of the cap 40, the cap 40 is disposed between the upper wall portion 32d and the front wall portion 32c of the lower housing 32. The cap 40 is assembled to the lower housing 32 by fitting both ends of the shaft pin 42 into the holes 32b1 of the side wall portions 32b.

Next, the rear wall portion 312 of the upper housing 31 is arranged so as to abut on the side wall portions 32b and the bottom wall portion 32a of the lower housing 32. In this state, the four holes 312b of the upper housing 31 and screw holes provided in the four mounting portions 32b2 of the lower housing 32 are aligned with each other, and bolts B are rotated and inserted from the rear side, so that the upper housing 31 and the lower housing 32 are assembled. In this way, the second connector 20 shown in FIG. 1 is configured.

Figure 3A:
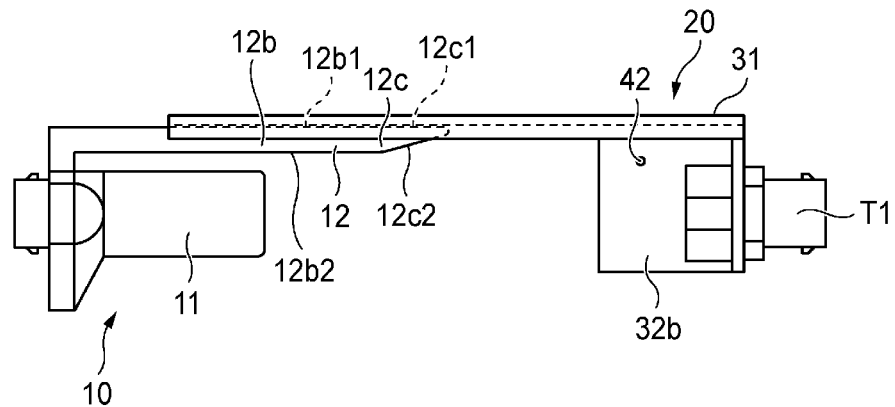
FIGS. 3A to 3C are side views showing images of assembling the connector.
Figure 3B:
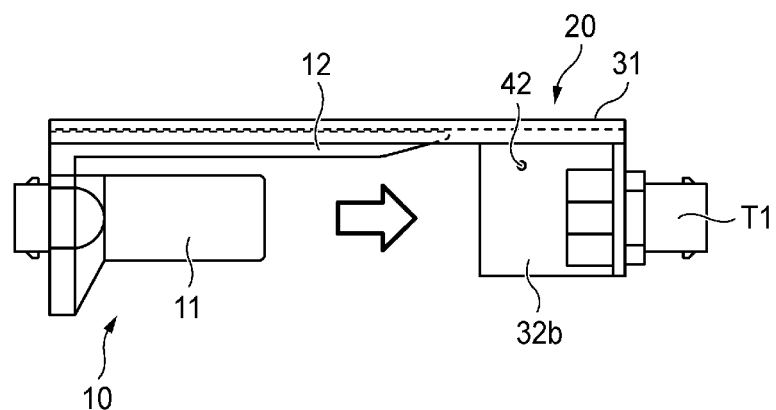
Figure 3C:
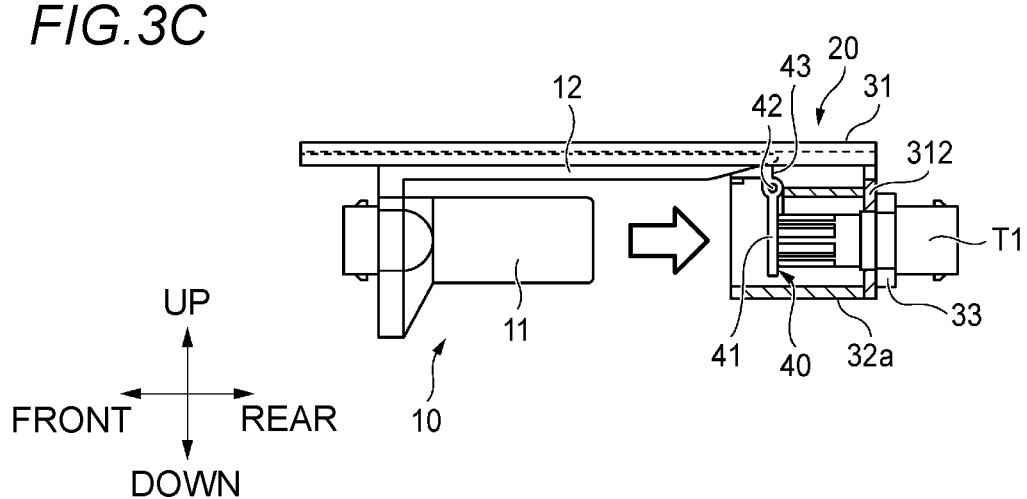
Figure 5:
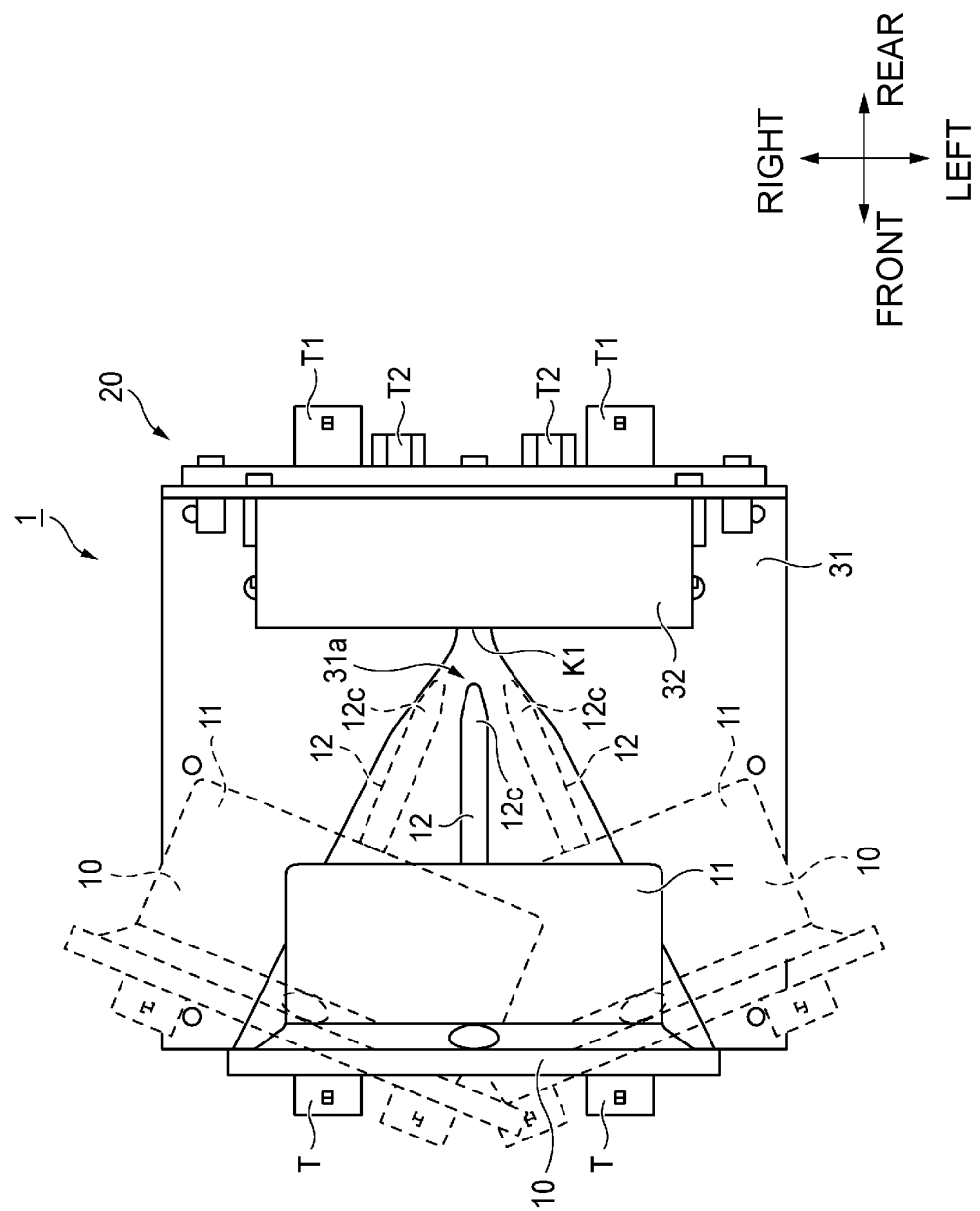
FIG. 5 is a bottom view showing an image of assembling the connector.
Figure 6:
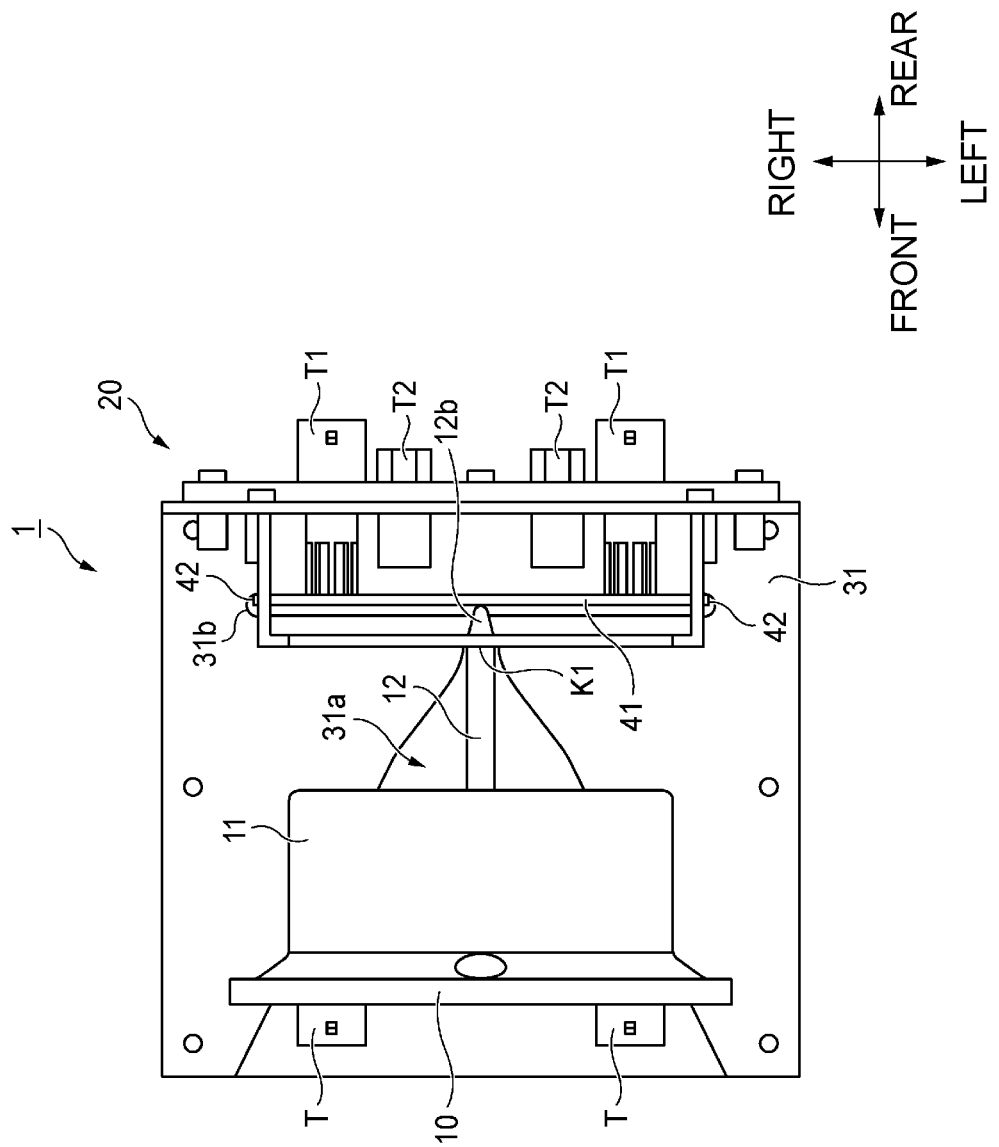
FIG. 6 is a bottom view showing an image of assembling the connector.
Figure 8:
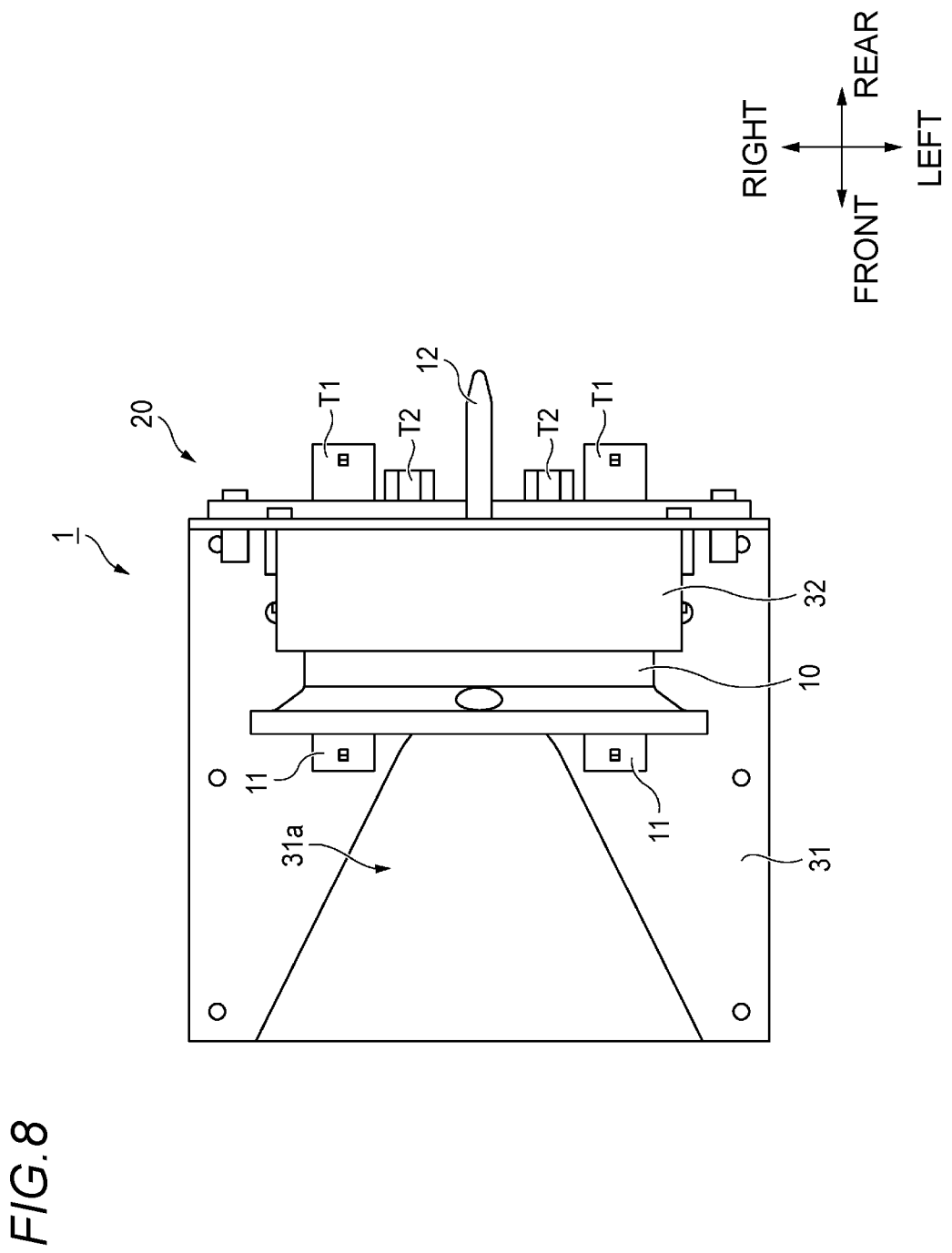
FIG. 8 is a bottom view showing an image after the connectors are fitted to each other.

The fitting of the first connector 10 and the second connector 20 will be described with reference to FIGS. 3A to 8. FIGS. 3A and 3B are side views showing an assembly image of the connector 1, and FIG. 3C is a side view of the connector 1 showing a cross section of the second connector 20 cut along planes along the up-down direction and front-rear direction on a right side of the left side wall portion 32b. Progressing of the assembly of the connector 1 is shown in an order of FIGS. 3A to 3C. FIGS. 4 to 6 are bottom views corresponding to FIGS. 3A to 3C, respectively, and FIG. 6 shows a state in which the bottom wall portion 32a of the second connector 20 is perspective. FIGS. 7A to 7C are cross-sectional views showing an operation image when the connector 1 is fitted, and show a partial cross section of the connector 1 obtained by cutting a left side of the terminal T1 on a left side along planes along the up-down direction and the front-rear direction. FIGS. 7A to 7C show the vicinity of the cap 40 before (closed state), during, and after (open state, after fitting) the projecting portion 12 presses the contact portion 43 of the cap 40, respectively. FIG. 8 is a bottom view showing the connector 1 after fitting shown in FIG. 7C. In the drawings after FIGS. 3A to 3C, the electric wires W1 and W connected to the terminals T1 and T are not shown.

As shown in FIGS. 3A and 4, the fitting of the first connector 10 and the second connector 20 may be started at an angle shifted to the left or right side as shown by broken lines in FIG. 4 instead of a correct fitting direction (front-rear direction) as the first connector 10 shown by solid lines in FIG. 4. Even if the fitting direction is not correct in this way, as the fitting progresses, the tip portion 12c of the projecting portion 12 is guided between the left and right side wall portions 31a3 while sliding on the hypotenuse portions 31a2 of the guide groove 31a (see FIGS. 3B and 5), and a position thereof is corrected (see FIGS. 3C and 6). In this series of flows, even if the fitting is started with the first connector 10 shifted in the up-down direction with respect to the second connector 20, by sliding the upper surface 12b1 of the projecting portion 12 on the bottom portion 31a1 of the guide groove 31a, inclination (positional deviation) in the up-down direction is corrected.

As shown in FIG. 6, in a state where the tip portion 12c of the projecting portion 12 is contained between the left and right side wall portions 31a3 of the guide groove 31a, a position of the first connector 10 is corrected so that the fitting direction is correct with respect to the second connector 20. Therefore, a subsequent operation of opening the cap 40 shown in FIGS. 7A to 7C is performed in a state where an angle at which the contact portion 43 of the cap 40 is pressed by the projecting portion 12 is restricted, so that the cap 40 can be reliably opened.

As shown in FIG. 7A, immediately before the tip portion 12c of the projecting portion 12 presses the contact portion 43 of the cap 40, the tip portion 12c is accommodated between the left and right side wall portions 31a3 of the guide groove 31a, and is corrected to the correct fitting direction. The projecting portion 12 is restricted from moving in the left-right direction by a space between the left and right side wall portions 31a3 of the guide groove 31a. Therefore, the tip portion 12c presses the contact portion 43 in a correct direction (see FIG. 7B), and the first connector 10 is fitted to the second connector 20 without deviating from the correct fitting direction (see FIG. 7C). In this way, the housing 11 of the first connector 10 is inserted into the housing 30 of the second connector 20, so that the plurality of terminals T in the housing 11 are connected to the plurality of terminals T1 and T2 in the housing 30, respectively. After the fitting is completed, as shown in FIG. 8, the projecting portion 12 projects rearward from the housing 30 (second opening portion K2) of the second connector 20.

When the first connector 10 and the second connector 20 are separated from a state after the fitting is completed shown in FIG. 8, since the pressing of the contact portion 43 by the projecting portion 12 is released, due to an urging force of the torsion coil spring 45, the cap 40 is rotated so as to be close to the terminals T1 and T2 to be in the close state.

As described above, when the connector 1 is fitted, the projecting portion 12 is guided by the guide groove 31a and enters the opening portion K1 in front of the shall pin 42, so that the projecting portion 12 can press the contact portion 43 of the cap 40 in a state where the position is corrected to the correct fitting direction. Therefore, even if the first connector 10 and the second connector 20 are shifted from the correct fitting direction at the start of fitting, the projecting portion 12 is guided by the guide groove 31a so that the position is corrected. Therefore, the cap 40 can be reliably opened. Therefore, fitting failure can be prevented and thus the connector 1 can be reliably fitted.

According to the connector 1 of the present embodiment, by providing the projecting portion 12 on an upper side of the first connector 10 and providing the guide groove 31a on the upper housing 31 of the second connector 20, both a function of pressing the cap 40 and a function of guiding the fitting of the connector 1 can be realized. Therefore, since it is not necessary to provide a configuration in order to realize a function, it is possible to prevent expansion of a size of the connector 1 and it is not necessary to provide a new component.

The present disclosure is not limited to the embodiment described above, and modifications, improvements, and the like can be made as appropriate. In addition, materials, shapes, dimensions, numerical values, forms, numbers, arrangement locations, and the like of components in the embodiment described above are optional and are not limited as long as the present disclosure can be achieved.

According to a first illustrative aspect of the present disclosure, a connector (1) includes: a first connector (10); and a second connector (20), the connector (1) being configured by the first connector (10) and the second connector (20) which are fitted and electrically connected to each other. The first connector (10) includes: a first housing (11), and a projecting portion (12) that projects from an end portion (11b) of the first housing (11) and extends toward the second connector (20) in a fitting direction of the first connector (10) and the second connector (20). The second connector (20) includes: a terminal (T1, T2) extending in the fitting direction, a cap (40) including a cover portion (41) that covers a surface (front surface) of the terminal (T1, T2) on a side of the first connector (10), a rotating shaft (shaft pin 42) provided on an edge portion of the cover portion (41), and a contact portion (43) extending to an opposite side to the cover portion (41) from the rotating shaft (42) and abuttable on the projecting portion (12), and a second housing (housing 30) including a guide groove (31a) that guides the projecting portion (12) and supporting the rotating shaft (42). The guide groove (31a) extends along the fitting direction from an opening portion (first opening portion K1) on the side of the first connector (10) with respect to the rotating shaft (42) toward an opposite side (rear side) to the first connector (10).

According to the connector of the first illustrative aspect, the first connector includes the projecting portion that projects from the end portion of the first housing and extends in the fitting direction, and the second connector includes the cap that rotates around the rotating shaft to cover the terminal, and the guide groove that guides the projecting portion and extends from the opening portion along the fitting direction. According to this configuration, when the connector is fitted, the projecting portion is guided by the guide groove and enters the opening portion in front of the rotating shaft, so that the projecting portion can press the contact portion of the cap in a state where a position thereof is corrected to a correct fitting direction. Therefore, even if the first connector and the second connector are shifted from the correct fitting direction at the start of fitting, the projecting portion is guided by the guide groove so that the position is corrected, and thus the cap can be reliably opened, fitting failure can be prevented, and the connector can be reliably fitted.

By providing the projecting portion on the first connector and providing the guide groove on the second connector, both a function of pressing the contact portion of the cap and a guide function of correcting a relative position between the first connector and the second connector and correct to a correct fitting position can be realized. Therefore, it is possible to prevent expansion of a size of the connector, and it is not necessary to provide a new component for each function.

According to a second illustrative aspect of the present disclosure, the second housing (housing 30) may include a flat plate portion (311) extending from a position (position of concave portion 31b) corresponding to the rotating shaft (42) toward the side (front side) of the first connector (10) in the fitting direction. The guide groove (31a) may be provided in the flat plate portion (311) and includes a tapered portion (TP) that decreases in width from the side of the first connector (10) toward the opening portion (K1).

According to the connector of the second illustrative aspect, since the guide groove includes the tapered portion, even if the first connector is started to be fitted to the second connector while being inclined with respect to the correct fitting direction, the projecting portion is guided by the tapered portion and the first connector is semi-automatically corrected to the correct fitting direction.

According to a third illustrative aspect of the present disclosure, the terminal (T1, T2) may include a first terminal (T1) and a second terminal (T2) having a diameter smaller than that of the first terminal (T1). The guide groove (31a) may be provided in a region close to the second terminal (T2) in the second housing (30).

According to the connector of the third illustrative aspect, since a space wider than that around the first terminal is secured around (close to) the second terminal, whose diameter is smaller than that of the first terminal, by providing the guide groove in this space, a dead space can be effectively utilized.

The present disclosure can provide a connector capable of position correction during fitting.

What is claimed is:

1. A connector, comprising:
a first connector; and
a second connector, wherein:
the connector is configured by the first connector and the second connector which are configured to be fitted and electrically connected to each other,
the first connector includes:
a first housing, and
a projecting portion that projects from an end portion of the first housing and extends toward the second connector in a fitting direction of the first connector and the second connector,
the second connector includes:
a terminal extending in the fitting direction,
a cap including a cover portion that covers a surface of the terminal on a side of the first connector, a rotating shaft provided on an edge portion of the cover portion, and a contact portion extending to an opposite side to the cover portion from the rotating shaft and abuttable on the projecting portion, and
a second housing including a guide groove that guides the projecting portion and supporting the rotating shaft,
the guide groove extends along the fitting direction from an opening portion on the side of the first connector with respect to the rotating shaft toward an opposite side to the first connector,
the second housing includes a flat plate portion extending from a position corresponding to the rotating shaft toward the side of the first connector in the fitting direction, and
the guide groove is provided in the flat plate portion and includes a tapered portion that decreases in width from the side of the first connector toward the opening portion.

2. The connector according to claim 1, wherein
the terminal includes a first terminal and a second terminal having a diameter smaller than that of the first terminal, and
the guide groove is provided in a region close to the second terminal in the second housing.

* * * * *